(12) United States Patent
Gardner et al.

(10) Patent No.: US 7,798,837 B1
(45) Date of Patent: Sep. 21, 2010

(54) CONNECTOR SECURITY COVER

(75) Inventors: Douglas Gardner, Dumont, NJ (US);
Robert Hansen, Succasunna, NJ (US)

(73) Assignee: Ohaus Corporation, Pine Brook, NJ (US)

( * ) Notice: Subject to any disclaimer, the term of this patent is extended or adjusted under 35 U.S.C. 154(b) by 0 days.

(21) Appl. No.: 12/418,353

(22) Filed: Apr. 3, 2009

(51) Int. Cl.
*H01R 13/62* (2006.01)

(52) U.S. Cl. .......................... 439/296; 174/66; 174/92

(58) Field of Classification Search ......... 439/301–303, 439/296; 174/5, 150, 50.51, 50.53, 66, 92
See application file for complete search history.

(56) References Cited

U.S. PATENT DOCUMENTS

| | | | | |
|---|---|---|---|---|
| 4,426,108 A | * | 1/1984 | Kesselman | 292/307 B |
| 4,438,995 A | * | 3/1984 | Fisher et al. | 439/147 |
| 4,799,599 A | | 1/1989 | Herrmann | |
| 5,473,115 A | * | 12/1995 | Brownlie et al. | 174/50 |
| 5,816,853 A | | 10/1998 | Buekers et al. | |
| 7,022,915 B1 | * | 4/2006 | Galguera | 174/66 |
| 7,425,146 B2 | * | 9/2008 | Valentin | 439/304 |

\* cited by examiner

*Primary Examiner*—Michael C Zarroli
(74) *Attorney, Agent, or Firm*—Standley Law Group LLP

(57) ABSTRACT

A connector security cover for enclosing and sealing a connection between a signal line cable connector and a weighing terminal of a platform scale. An exemplary embodiment of the cover generally includes a body with first and second ends. The first end may have an opening with a first aperture defined surface adapted to engage a cable connector. The second end may have an opening with an aperture defined surface adapted to engage a corresponding element on the weighing terminal. The body may comprise hinged or non-hinged body halves that are secured closed by a fastening device. A tamper indicating device may be associated with the body and adapted to indicate if the body is opened after engagement. The cover may be placed around the cable connector and a corresponding element on the weighing terminal to restrict movement of the cable connector with respect to the weighing terminal.

22 Claims, 5 Drawing Sheets

CONNECTOR SECURITY COVER

BACKGROUND OF THE INVENTIVE FIELD

Exemplary embodiments of the present invention are directed to a security cover. More specifically, exemplary embodiments of the present invention are directed to a connector security cover for enclosing and sealing a connection between a cable connector and a weighing terminal of a weighing scale.

Typically, a platform scale is composed of three main components: a scale platform, an indicator attachment, and a weighing indicator terminal. The indicator terminal and the platform are generally connected by a signal line that transmits the weighing signal of the platform to the indicator. Usually the signal line is secured to the weighing terminal via a permanent, hard-wired connection due to the regulatory and legal requirements for weighing devices used in commerce.

A weighing device such as a platform scale is typically comprised of a weighing terminal and a scale platform. Additionally, a weighing sensor is typically associated with the scale platform. A signal from the weighing sensor is typically supplied to the weighing terminal using a signal line. The signal from the weighing sensor is used to establish the calibration parameters of the platform scale.

National and international calibration regulations typically mandate that a weighing device used in commerce be officially calibrated and sealed, and that the seal be maintained as long as the device is used in commerce. Therefore, in order to prevent tampering with the calibration of a platform scale, it may be required that the signal line connection to the weighing terminal be secured or locked so that a user cannot tamper with or disconnect the signal line connection. Usually, the securing or locking of the signal line connector to the weighing terminal is accomplished by hard-wiring the signal line connector to the weighing terminal, thereby creating a permanent connection between the components. In other cases, where a removable cable connector is used, a sealing material may be applied between the connector and the weighing terminal to prevent or indicate tampering or removal.

It can be understood that the permanent, hard-wiring of the signal line connector to the weighing terminal can be a time consuming process. Additionally, the permanent hard-wiring of the signal line connector to the weighing terminal makes any repair or replacement of the signal line more difficult, and may also hinder repair or modification of a platform scale by complicating the disassembly of a terminal from a scale platform. Further, with respect to those platform scales that employ a removable cable connector, initial application of a sealing material between the connector and a weighing terminal, and subsequent reapplication after repairs, etc., offers similar problems to those just described.

Accordingly, what is needed is a non-permanent device for ensuring a secure connection between a platform scale weighing terminal and a platform scale platform. Preferably, such a device allows for easy installation (set-up) and/or repair of a platform scale, while maintaining a properly secured connection between its signal line and weighing terminal without the use of a hard-wired or other substantially permanent signal line connection. Such a device may conform to national and international regulations regarding platform scale security.

SUMMARY OF THE GENERAL INVENTIVE CONCEPT

Exemplary embodiments of the present invention are directed to a connector security cover for enclosing a signal line (cable) connector and sealing the connector to a weighing terminal of a platform scale. Certain embodiments of the cover may be used to securely lock cable connectors of different sizes and/or geometries. An exemplary embodiment of the cover generally includes a substantially hollow body with open first and second ends. In one exemplary embodiment, the body comprises separate halves that form a closed body when joined. In another exemplary embodiment, the body comprises separate but hingedly-connected halves that form a closed body when rotated together.

Typically, each half of the body may have a first opening, wherein a first aperture defined surface is adapted to engage a cable connector. A second opening is provided in each body half and preferably includes a second aperture defined surface adapted to engage a connector or other protruding feature of the weighing terminal. The second body half may have a construction that is similar or identical to the first body half.

Exemplary embodiments of the cover may include a fastening device that joins the body halves. A tamper indicating device may be associated with the cover and be adapted to indicate if the body halves have been separated after engagement. The cover may be placed around a cable connector and a corresponding connector or feature on a weighing terminal and fastened to retain the cable connector to that of the weighing terminal.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
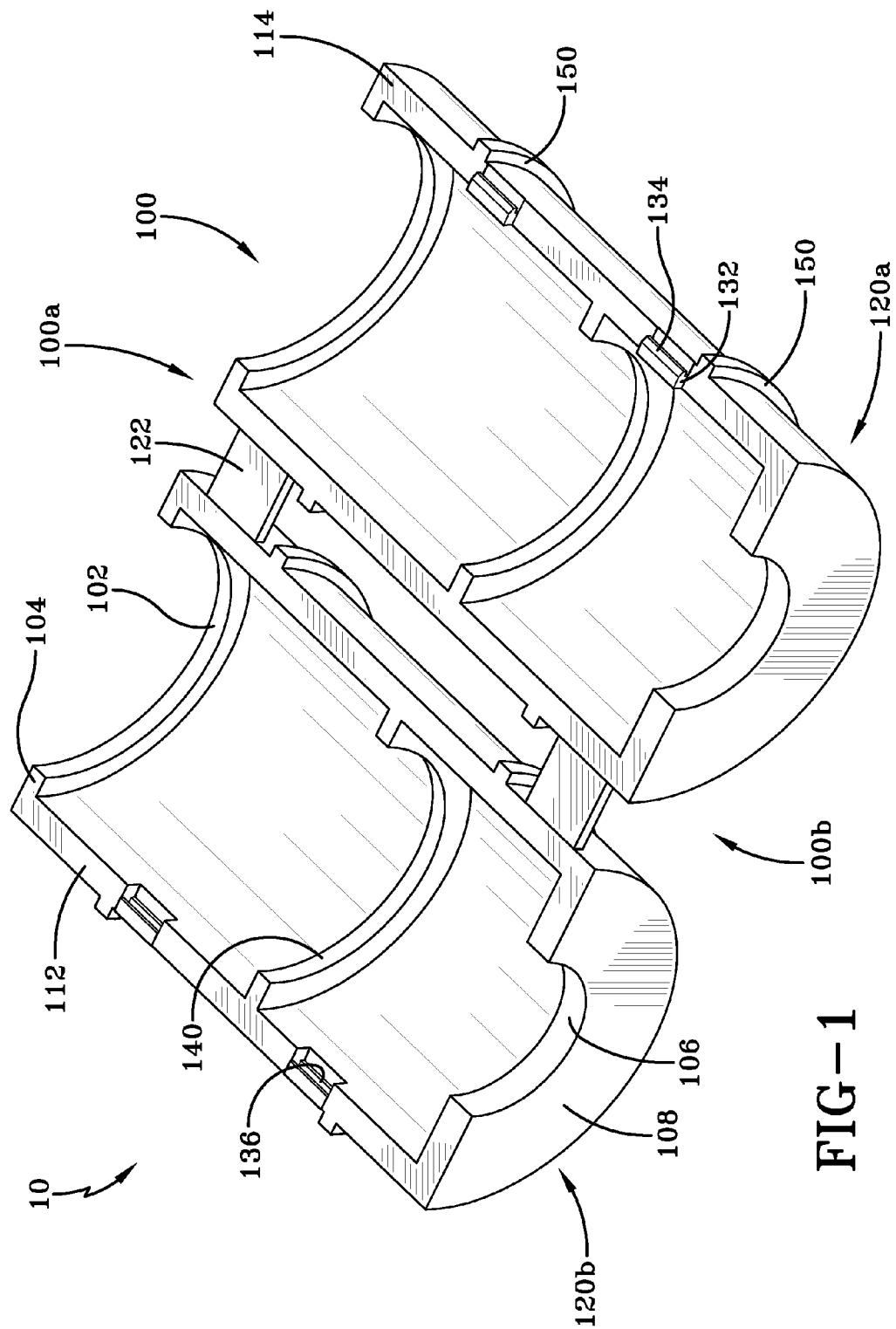
FIG. 1 illustrates one exemplary embodiment of a connector security cover comprised of separate hinged halves, the cover shown in an open condition.

FIG. 1 depicts one exemplary embodiment of a connector security cover for enclosing and sealing a connection between a cable connector and a weighing terminal. As shown, this particular connector security cover 10 (hereinafter "security cover" or "cover") includes a body 100 with a first and second end 100a, 100b.

In this embodiment, the body 100 is substantially tubular in shape. However, it should be realized that the body 100 may have any number of cross-sectional geometries that permit proper engagement of the cover 10 during use. The body 100 of this particular cover 10 is also comprised of separate, hingedly connected halves 120a, 120b.

In this particular embodiment, the two halves 120a, 120b are hinged together as a unitary molding along a common edge. The hinge 122 may be a living or integral hinge so that the hinge 122 and body portions 120a, 120b may be formed from a single piece, as shown. In other embodiments, the hinge 122 may be affixed to separate body halves 120a, 120b in any manner that minimizes tampering by an individual. In still other embodiments (not shown), a cover body may be comprised of separate and non-hinged body halves.

The first end 100a of this exemplary body 100 has a first opening 102 with a first aperture defined surface 104 that is adapted to engage a cable connector. Examples of cable connectors that may be engaged by the first aperture 104 may be adapted to engage, include, but are not limited to, quick disconnects and connectors of pin-type or header design. In this particular example, the first aperture defined surface creates a substantially circular opening 102 to facilitate engagement with a substantially circular cable connector.

Similarly, the second end 100b has a second opening 106 with a second aperture defined surface 108 that is adapted to engage a corresponding connector or other protruding feature associated with the weighing terminal. In this particular embodiment, the second aperture defined surface 108 is adapted to engage a substantially circular corresponding connector associated with the weighing terminal. However, the corresponding connector associated with the weighing terminal may be any number of shapes or geometries, and the second aperture defined surface 108 may be adapted to engage such varying shapes or geometries.

It can be understood that exemplary embodiments of the body 100 have a longitudinal seam 110 when the cover is closed. Typically, but not necessarily, the longitudinal seam 110 has corresponding longitudinal edges 112 and 114 to facilitate proper engagement of the cover 10. Although the longitudinal edges 112 and 114 are substantially straight in this embodiment, other embodiments may have edges of any number of corresponding shapes or geometries to facilitate proper engagement of the cover 10. In whatever form, the hinged nature of the cover 10 allows an individual to position and engage the cover around the cable connector and weighing terminal, after the cable connector has been engaged with the weighing terminal.

In exemplary embodiments, such as the embodiment shown, a fastening device 130 may secure the body halves 120a, 120b in a closed position. The fastening device may include a snap-fit connection that when engaged, restricts the movement of the longitudinal edges 112 and 114 relative to one another. In the exemplary embodiment shown, the snap-fit connection may reside on one body half 120a and may include a tab 132 with a protrusion 134 projecting from the surface thereof. A complementary slot 136 may be associated with the second body half 120b. Although this embodiment uses a snap-fit connection to secure together the body halves 120a, 120b, other embodiments of the cover 10 may use any number of fastening devices that minimize tampering of the cover 10.

With the cover 10 substantially closed and each tab 132 and complementary slot 136 in a substantially parallel facing relationship, each tab 132 may be biased for easier insertion within its complementary slot. In this particular embodiment, the protrusion 134 is located on an outside surface of the tab 132, therefore, each tab is biased inwardly for insertion within its complementary slot 136. When the tabs 132 are fully inserted with their complementary slots 136, the protrusion 134 of each tab engages its complementary slot, thereby restricting the relative movement of body half.

The interior face of the body 100 may include at least one inwardly projecting member 140 that is adapted to engage a raised portion of the cable connector. In this particular embodiment, the inwardly projecting member 140 is an inner ridge that circumnavigates the interior surface of the body 100. While the inwardly projecting member 140 of this particular body 100 is of a ridge design, it is to be understood that such inwardly projecting members may be of virtually any shape or size necessary to engage and retain cable connections of varying size and geometry, or may be designed to retain only one particular type of cable connection.

At least one outer ridge or other structure may be included in certain embodiments of the body 100 to increase the strength and therefore, the tamper-resistance of the cover 10. In this particular embodiment, an outer ridge 150 circumnavigates the outer face of the body 100 for this purpose. Depending upon design and other considerations, the outer ridge 150 may have any number of shapes and/or geometries.

The body 100 may be made of any number of materials, such as, for example, fiberglass, plastics, composites, or metals. Preferably, the body 100 is of sufficient strength and rigidity to prevent or minimize the possibility of tampering with the cover 10. As such, certain components of the body 100, such as, for example, the longitudinal edges 112 and 114 or the apertures 104 and 108 may be fabricated from high strength materials to inhibit tampering.

In some exemplary embodiments, the body 100 may be provided with one or more grip assisting features. For example, the body may be provided with a knurled texture to assist an individual with closing or opening the cover 10 during use. A variety of other textures and/or treatments for improving grip may also be applied.

A tamper indicating device 160 may be associated with the cover 10 to indicate if the body halves 120a, 120b have been separated, if the fastening device 130 has been released, etc. Whatever the type of tamper indicating device used, it is preferred that the tamper indicating device 160 complies with either national or international regulations. Non-limiting examples of tamper indicating devices 160 that may be used include a lock wire (lead seal), and a destructible paper seal label. In operation, the tamper indicating device 160 is typically secured to the body 100 after the fastening device 130 is engaged.

Figure 2:
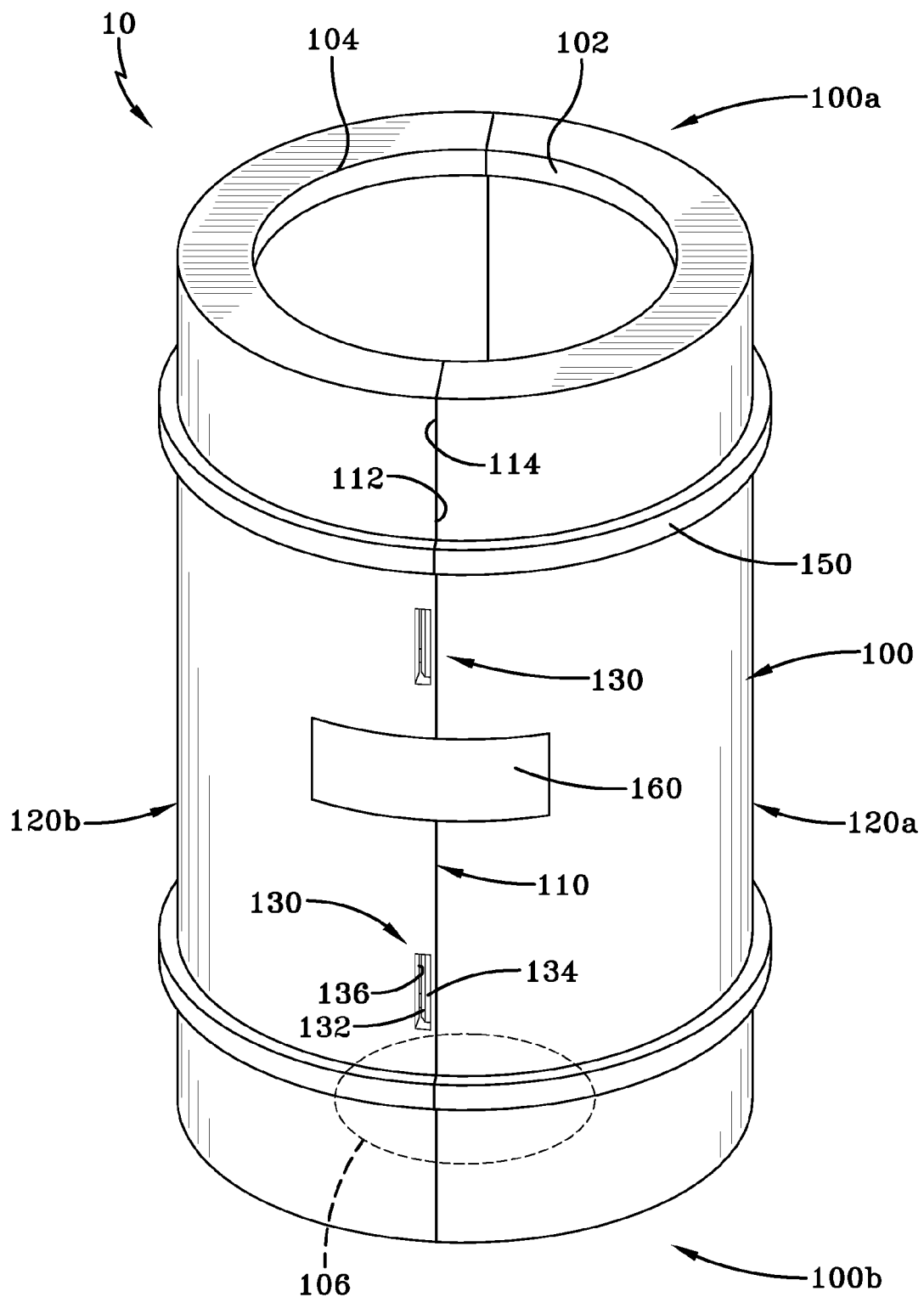
FIG. 2 depicts the connector security cover of FIG. 1 in a closed condition.
Figure 3:
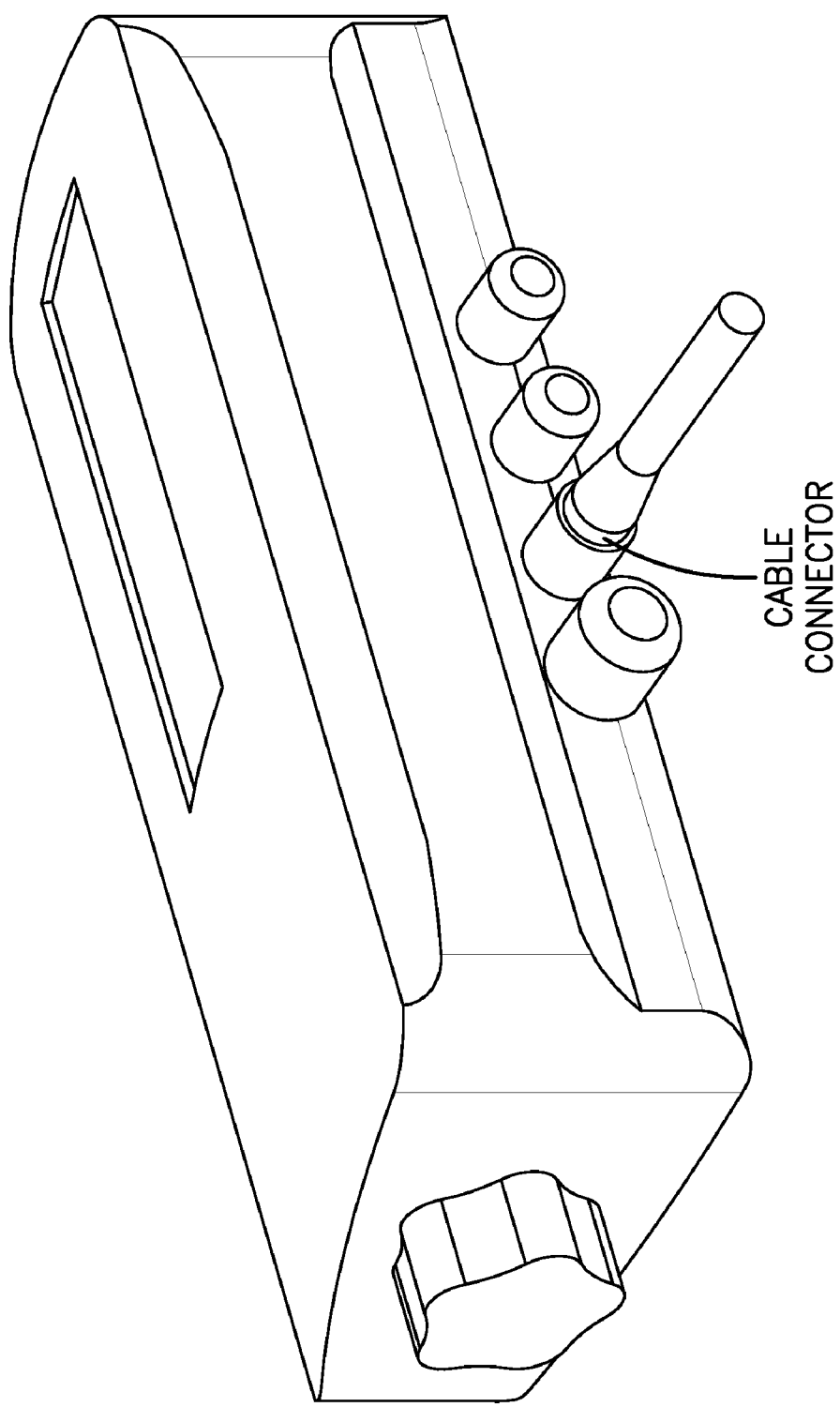
FIG. 3 illustrates an example of a cable connector connected to a connecting port of a weighing terminal prior to installation of a connector security cover of the present invention.
Figure 4:
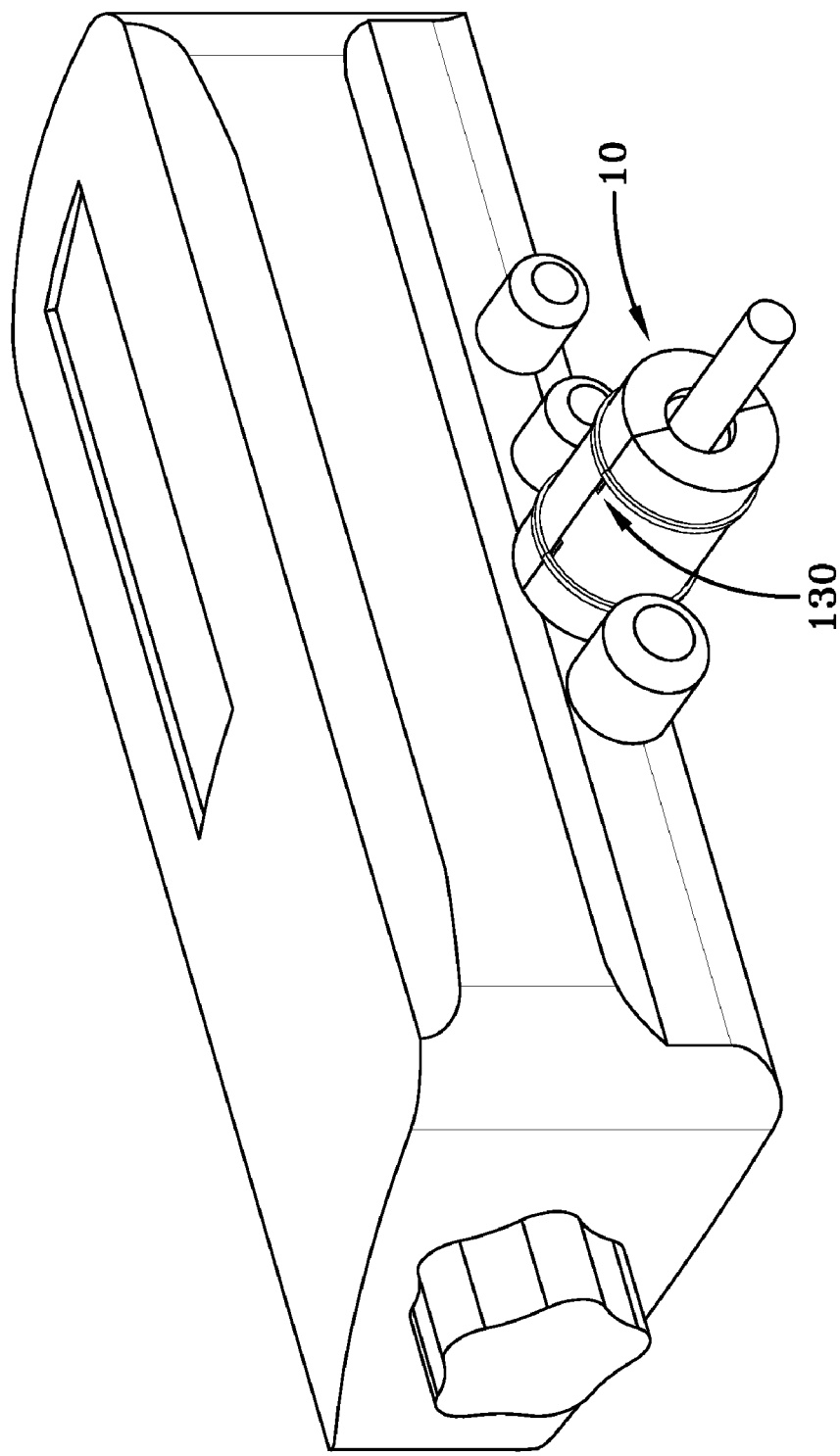
FIG. 4 shows the connector security cover of FIGS. 1-2 installed to the cable connector and weighing terminal of FIG. 3.
Figure 5:
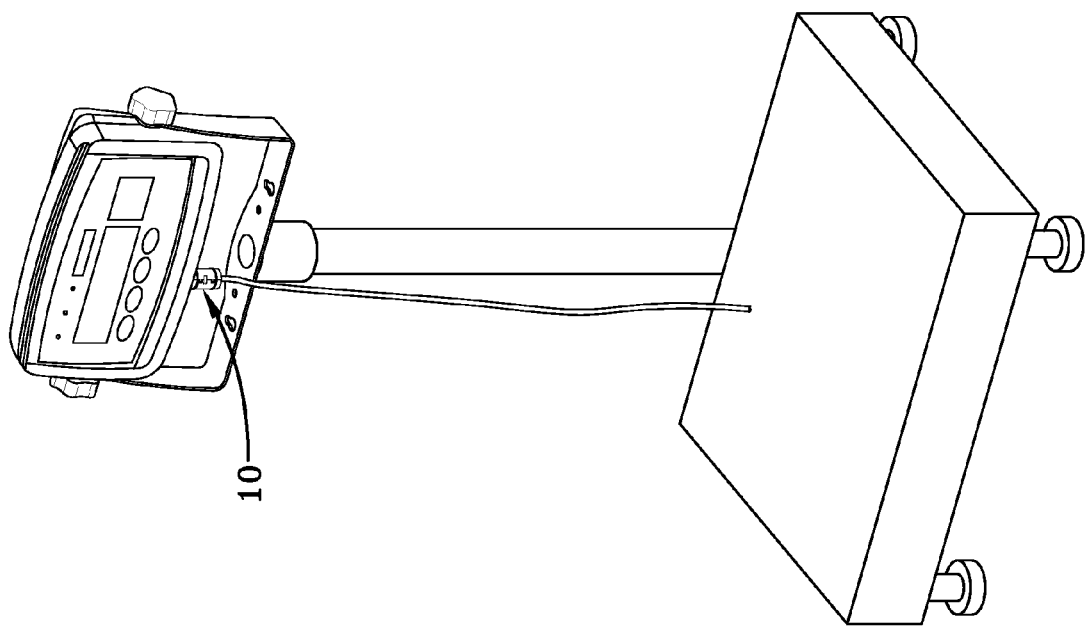
FIG. 5 is a perspective view of an exemplary platform scale of which the secured weighing terminal of FIG. 3 forms one part.

As seen in FIGS. 2-4, exemplary embodiments of the cover 10 may be used in conjunction with a platform scale that includes a scale platform, an indicator attachment, a weighing terminal, and an indicator signal line cable that runs from the scale platform to the weighing terminal. In this example, the indicator signal line cable includes a cable connector that releasably connects the indicator signal line cable with the weighing terminal. Exemplary embodiments of the cover 10 used in conjunction with the platform scale may allow for set-up and installation of the scale in a much easier and efficient fashion, without having to make the necessary individual wire connections required by connector hard-wiring.

Although the exemplary embodiments of connector security covers described above enclose and seal a connection between a cable connector and a weighing terminal, other exemplary embodiments of a security cover of the present invention may be placed along the indicator signal line cable that runs between the weighing terminal and the scale platform. In one example, the indicator signal line cable may be divided into two different portions, where one end of a first portion of the cable is hard-wired to the weighing terminal, and one end of a second portion of the cable is hard-wired to the scale platform. In this example, an exemplary embodiment of the cover may secure and enclose the connection between the two free ends of the cable, effectuating an alternative secured connection between the weighing terminal and the scale platform.

While certain embodiments of the present invention are described in detail above, the scope of the invention is not to be considered limited by such disclosure, and modifications are possible without departing from the spirit of the invention as evidenced by the following claims:

What is claimed is:

1. A connector security cover for enclosing and sealing a connection between a cable connector and a weighing terminal comprising:
    a substantially hollow body formed from two body halves, the body having first and second ends, the first end having an opening including a first aperture defined surface that extends inward to engage a cable connector, the second end having a second opening including a second aperture defined surface that extends inward to engage a corresponding element on the weighing terminal, such that detachment of the cable connector from the weighing terminal is prevented when the body is installed thereto;
    a fastening device that secures the body in a closed position; and
    a tamper indicating device associated with the body and adapted to indicate if the body has been opened after being closed and fastened.

2. The cover of claim 1, wherein the body is a tubular member having an inner and outer diameter extending from the first end to the second end.

3. The cover of claim 1, wherein the body halves are hingedly joined along one side thereof.

4. The cover of claim 3, wherein the hinge(s) is an integral hinge(s).

5. The cover of claim 3, wherein the body halves are identical.

6. The cover of claim 1, wherein the fastening device includes a snap-fit connection to restrict relative movement of each body half with respect to the other when engaged.

7. The cover of claim 6, wherein the fastening device comprises:
    a tab with a protrusion projecting from a surface thereof, the tab associated with a first half of the body; and
    a complementary slot associated with a second half of the body, wherein the tab and said complementary slot are in substantially parallel facing relationship on each portion, each tab is biased for insertion within its complementary slot and, when fully inserted, the protrusions of each tab engage each complementary slot, thereby restricting the relative movement of each body half with respect to the other.

8. The cover of claim 7, wherein the protrusion of the tab is located on an outside surface of the tab, and each tab is biased inwardly for insertion within its complementary slot.

9. The cover of claim 1, wherein an interior face of the body includes at least one inwardly projecting member adapted to engage a raised portion of the cable connector.

10. The cover of claim 1, wherein the tamper indicating device is selected from the group consisting of a lock wire and a destructible paper seal label.

11. The cover of claim 1, wherein the tamper indicating device is selected from the group consisting of a lock wire and a destructible paper seal label.

12. The cover of claim 1, wherein the tamper indicating device is selected from the group consisting of a lock wire and a destructible paper seal label.

13. A connector security cover for enclosing and sealing a connection between a cable connector and a weighing terminal comprising:
    a substantially hollow body formed from two hingedly-connected body halves, the body having first and second ends;
    an opening in the first end of the body, the opening including a first aperture defined surface that extends inward to engage a cable connector;
    an opening in the second end of the body, the opening including a second aperture defined surface that extends inward to engage a corresponding element on the weighing terminal, such that detachment of the cable connector from the weighing terminal is prevented when the body is installed thereto;
    a fastening device that secures the body in a closed position; and
    a tamper indicating device associated with the body and adapted to indicate if the body has been opened after being closed and fastened.

14. The cover of claim 13, wherein the body is a tubular member having an inner and outer diameter extending from the first end to the second end.

15. The cover of claim 13, wherein the hinge(s) is an integral hinge(s).

16. The cover of claim 13, wherein the body halves are identical.

17. The cover of claim 13, wherein the fastening device includes a snap-fit connection to restrict relative movement of each body half with respect to the other when engaged.

18. The cover of claim 17, wherein the fastening device comprises:
    a tab with a protrusion projecting from a surface thereof, the tab associated with a first half of the body; and
    a complementary slot associated with a second half of the body, wherein the tab and said complementary slot are in substantially parallel facing relationship on each portion, each tab is biased for insertion within its complementary slot and, when fully inserted, the protrusions of each tab engage each complementary slot, thereby restricting the relative movement of each body half with respect to the other.

19. The cover of claim 18, wherein the protrusion of the tab is located on an outside surface of the tab, and each tab is biased inwardly for insertion within its complementary slot.

20. The cover of claim 13, wherein an interior face of the body includes at least one inwardly projecting member adapted to engage a raised portion of the cable connector.

21. A connector security cover for enclosing and sealing a connection between a cable connector and a weighing terminal comprising:
    a substantially hollow and tubular body formed from two substantially identical body halves connected by at least one integral hinge, the body having first and second ends and an interior diameter dimensioned to receive a cable connector;

an opening in the first end of the body, the opening including a first aperture defined surface that extends inward to engage the cable connector;

an opening in the second end of the body, the opening including a second aperture defined surface that extends inward to engage a corresponding element on the weighing terminal, such that detachment of the cable connector from the weighing terminal is prevented when the body is installed thereto;

a fastening device that secures the body in a closed position; and a tamper indicating device associated with the body and adapted to indicate if the body has been opened after being closed and fastened.

22. The cover of claim 21, wherein the fastening device includes a snap-fit connection comprising:

a tab with a protrusion projecting from a surface thereof, the tab associated with a first half of the body; and a complementary slot associated with a second half of the body;

wherein the tab and said complementary slot are in substantially parallel facing relationship on each portion, each tab is biased for insertion within its complementary slot and, when fully inserted, the protrusions of each tab engage each complementary slot, thereby restricting the relative movement of each body half with respect to the other.

* * * * *